(12) United States Patent
Rotta et al.

(10) Patent No.: US 11,045,037 B2
(45) Date of Patent: Jun. 29, 2021

(54) BREWING UNIT, MACHINE AND SYSTEM FOR THE PREPARATION OF A BEVERAGE USING PREPACKAGED CAPSULES

(71) Applicant: LUIGI LAVAZZA S.P.A., Turin (IT)

(72) Inventors: Denis Rotta, Turin (IT); Simone Rosetta, Quarona (IT)

(73) Assignee: LUIGI LAVAZZA S.P.A., Turin (IT)

( * ) Notice: Subject to any disclaimer, the term of this patent is extended or adjusted under 35 U.S.C. 154(b) by 240 days.

(21) Appl. No.: 16/091,643

(22) PCT Filed: Apr. 5, 2017

(86) PCT No.: PCT/IB2017/051932
§ 371 (c)(1),
(2) Date: Oct. 5, 2018

(87) PCT Pub. No.: WO2017/175140
PCT Pub. Date: Oct. 12, 2017

(65) Prior Publication Data
US 2019/0117010 A1 Apr. 25, 2019

(30) Foreign Application Priority Data
Apr. 6, 2016 (IT) .......................... 102016000035304

(51) Int. Cl.
*A47J 31/44* (2006.01)
*A47J 31/36* (2006.01)
*A47J 31/40* (2006.01)

(52) U.S. Cl.
CPC ........ *A47J 31/4467* (2013.01); *A47J 31/3633* (2013.01); *A47J 31/3638* (2013.01); *A47J 31/407* (2013.01)

(58) Field of Classification Search
CPC ................ A47J 31/3633; A47J 31/3638; A47J 31/3642; A47J 31/407; A47J 31/4467; B67D 1/00
See application file for complete search history.

(56) References Cited

U.S. PATENT DOCUMENTS

2006/0266225 A1* 11/2006 Hammad ............ A47J 31/4482
99/279
2008/0121111 A1* 5/2008 Paget .................. A47J 31/0668
99/295
(Continued)

FOREIGN PATENT DOCUMENTS

CN 103565277 B 3/2016
WO 2014/015570 A1 1/2014

OTHER PUBLICATIONS

Written Opinion for PCT/IB2017/051932, dated Aug. 11, 2017.
International Search Report for PCT/IB2017/051932, dated Aug. 11, 2017.

*Primary Examiner* — Brian W Jennison
(74) *Attorney, Agent, or Firm* — Sughrue Mion, PLLC

(57) ABSTRACT

A brewing unit, machine and system for the preparation of a beverage using prepackaged capsules. The brewing unit (1) includes a piercing and liquid-supplying device (23, 34, 35) having points (35) for piercing the top wall (12) of a capsule (C) and a conduit (36) for supplying a flow of pressurized liquid to a brewing chamber above the top wall (12) of the capsule (C) and thereafter inside the capsule (C) through the pierces holes in the top wall. A drawer (3) holds a capsule (C) such that its top wall (12) lies in an inclined plane. A discharge channel (40) is provided in the drawer and in fluid communication with the region above the top wall (12) of the capsule (C) when, after the beverage has been prepared and dispensed, the piercing and liquid-supplying device moves from the extracted work position to the (Continued)

retracted rest position to allow the remaining liquid to be poured into the discharge channel (40).

5 Claims, 11 Drawing Sheets

(56) References Cited

U.S. PATENT DOCUMENTS

| | | | | |
|---|---|---|---|---|
| 2008/0223219 | A1* | 9/2008 | Magg | A47J 31/446 |
| | | | | 99/295 |
| 2012/0012007 | A1* | 1/2012 | Talon | A47J 31/4467 |
| | | | | 99/275 |
| 2015/0272377 | A1* | 10/2015 | Doglioni Majer | A47J 31/407 |
| | | | | 426/425 |

* cited by examiner

BREWING UNIT, MACHINE AND SYSTEM FOR THE PREPARATION OF A BEVERAGE USING PREPACKAGED CAPSULES

CROSS REFERENCE TO RELATED APPLICATIONS

This Application is a National Stage of International Application No. PCT/IB2017/051932 filed Apr. 5, 2017, claiming priority based on Italian Patent Application No. 102016000035304 filed Apr. 6, 2016.

BACKGROUND OF THE INVENTION

Field of the Invention

The present invention relates to a brewing unit, a machine and a system for the preparation of a beverage with the use of prepackaged capsules.

More specifically, the invention relates to a brewing unit comprising
- a support structure, which is stationary in operation, wherein there is defined a brewing zone in which a hydraulically operated piercing and liquid-supplying device is mounted so as to be movable between a retracted rest position and an extracted working position, and
- an associated movable drawer which forms a receptacle adapted to receive a capsule and is insertable into and extractable from the support structure for placing the capsule in the brewing zone with a top wall of the capsule facing said piercing and liquid-supplying device for the preparation of a beverage and, respectively, for allowing an exhausted capsule to be ejected once the beverage has been dispensed and a new capsule to be loaded;

wherein the piercing and liquid-supplying device comprises a plurality of points for piercing said top wall of the capsule placed in the brewing zone and a supply conduit for supplying a flow of pressurized liquid to a chamber adjacent to and above the top wall of the capsule and thereafter inside the capsule through the holes pierced by the points in the top wall of the capsule.

Background

A brewing unit of this type is known from CN 103565277 A. In the brewing unit described and illustrated in this document, the arrangement is such that when the capsule-holder drawer is inserted in the support structure with a capsule positioned in its receptacle, the top wall of the capsule lies substantially in a horizontal plane. For the preparation of a beverage, pressurized hot water is fed into a brewing chamber defined above the top wall (lid) of the capsule, which wall "bulges" downwards, forming a sort of bowl. Once the beverage has been dispensed, on the top wall of the exhausted capsule a quantity of water remains which, when the user extracts the drawer from the support structure, may splash out giving rise to possible mishaps.

It is an object of the present invention to provide a brewing unit that overcomes the disadvantage of the prior art mentioned above.

SUMMARY OF THE INVENTION

This and other objects are fully achieved according to the present invention by virtue of a brewing unit of the type defined above, characterized in that the arrangement is such that when the drawer is inserted into the support structure with a capsule placed in its receptacle, the top wall of the capsule lies substantially in a plane inclined to the horizontal plane and in that in the drawer a discharge channel is defined, which is adapted to be placed in hydraulic communication with the region above the top wall of the capsule when, once a beverage has been prepared and dispensed, the piercing and liquid-supplying device passes from the extracted work position to the retracted rest position to allow drainage of residual liquid from the aforementioned region towards the discharge channel.

The invention further relates to a machine for the preparation of beverages, comprising such a brewing unit, as well as a system for the preparation of beverages including such a machine and at least one capsule suitable for use in such a brewing unit.

BRIEF DESCRIPTION OF THE DRAWINGS

Further features and advantages of the invention will become apparent from the detailed description that follows, given purely by way of non-limiting example with reference to the accompanying drawings, where.

DETAILED DESCRIPTION OF THE INVENTION

Figure 1:
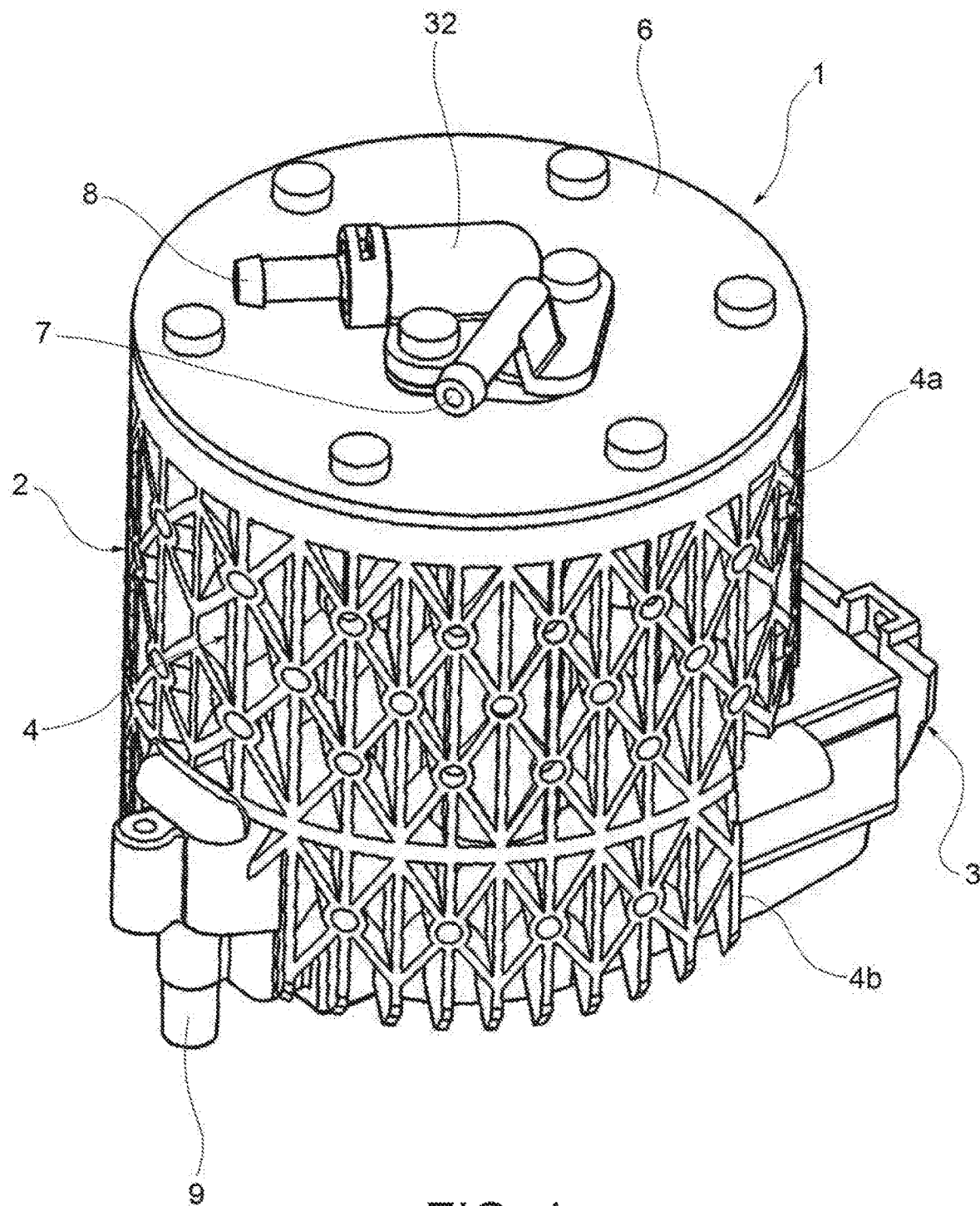
FIG. 1 is a perspective view of a brewing unit according to the present invention.
Figure 2:
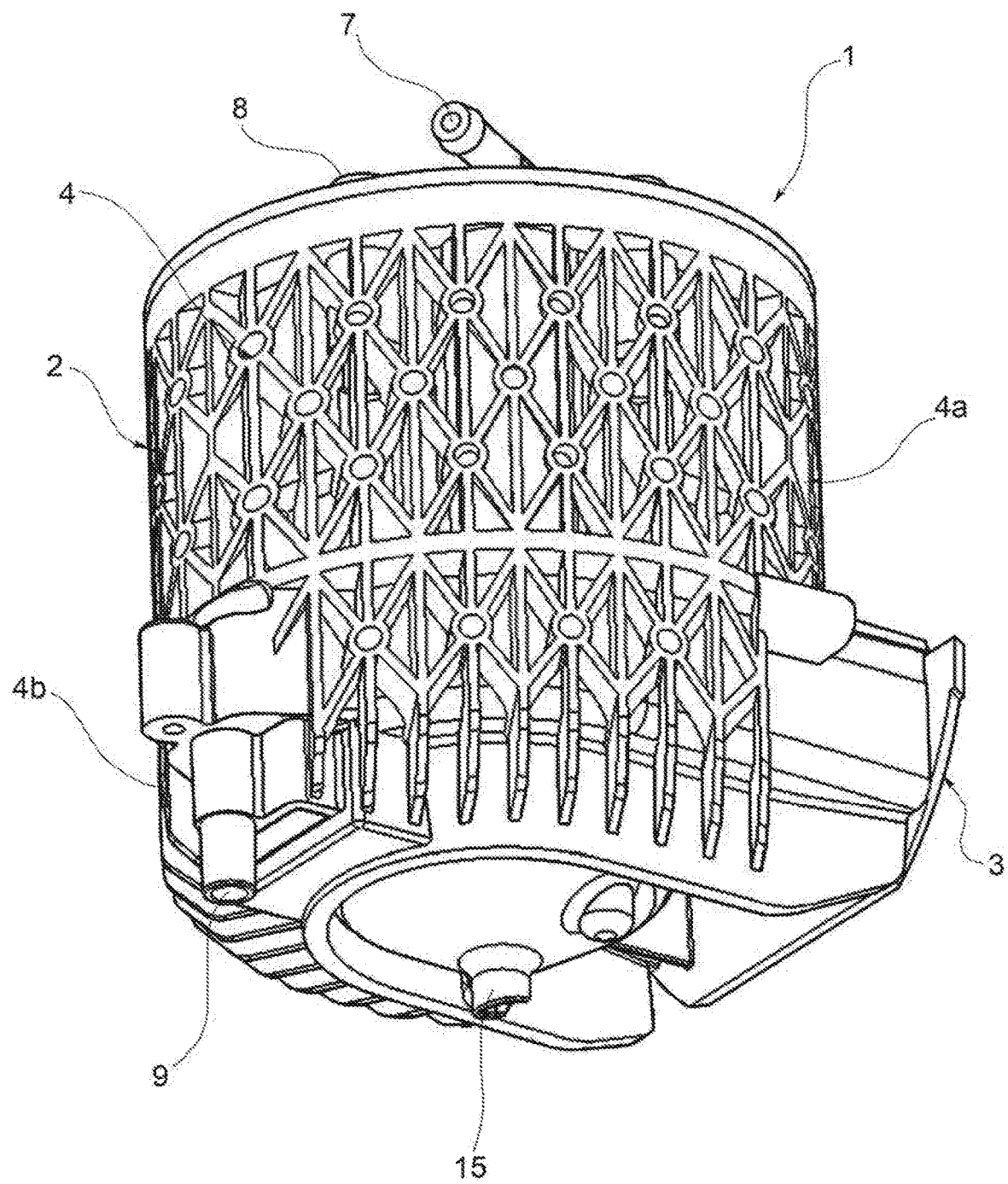
FIG. 2 is a bottom perspective view of the brewing unit of FIG. 1.

In the drawings, and in particular in FIGS. 1 to 9, a brewing unit for the preparation of beverages according to the present invention is generally indicated 1.

In the illustrated embodiment, the brewing unit 1 comprises a support structure 2 and a movable capsule-holder drawer 3 associated with the support structure 2.

Figure 3:
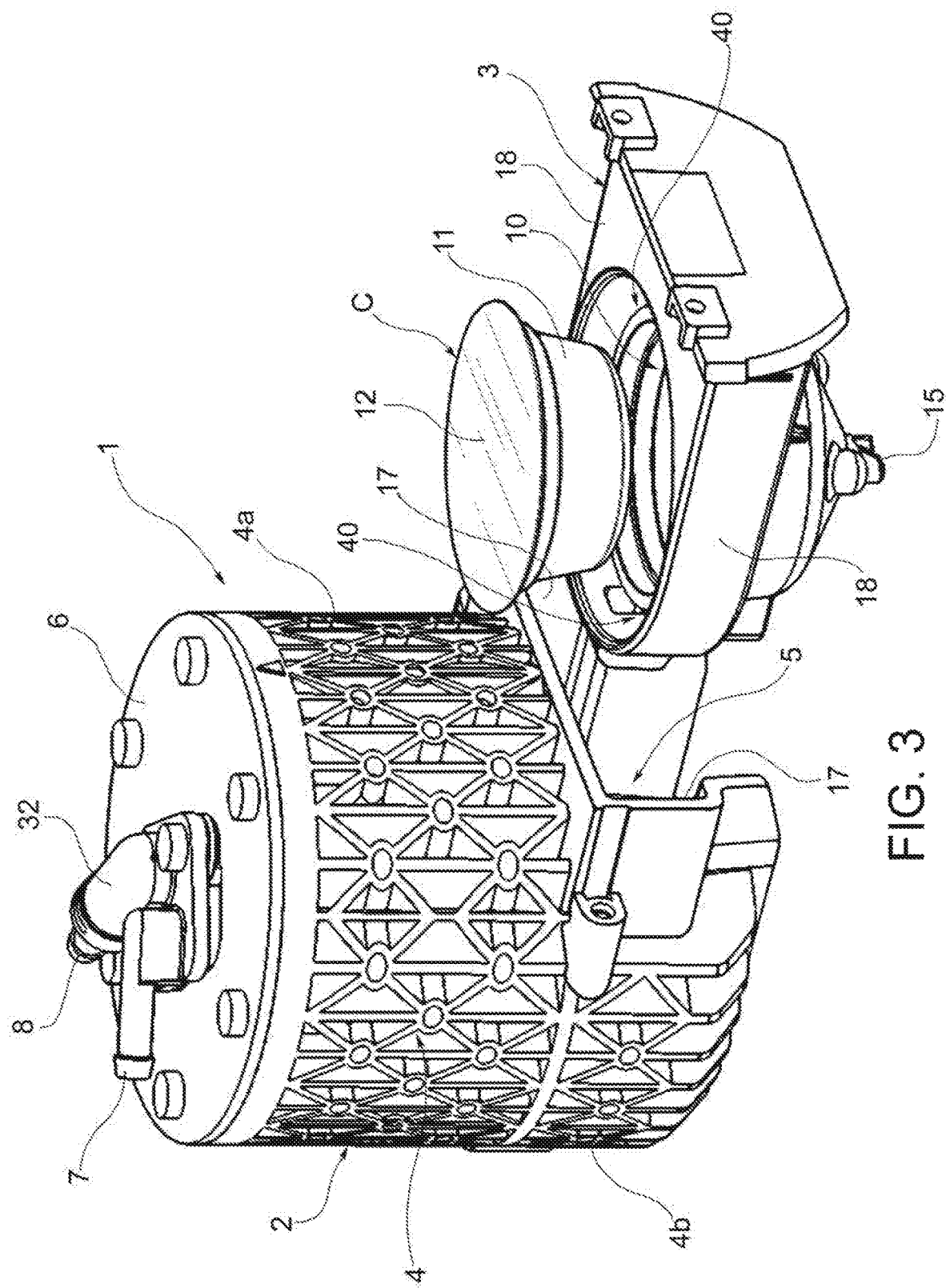
FIG. 3 is a further perspective view of the brewing unit of the preceding Figures, shown in a configuration with the drawer extracted.
Figure 4:
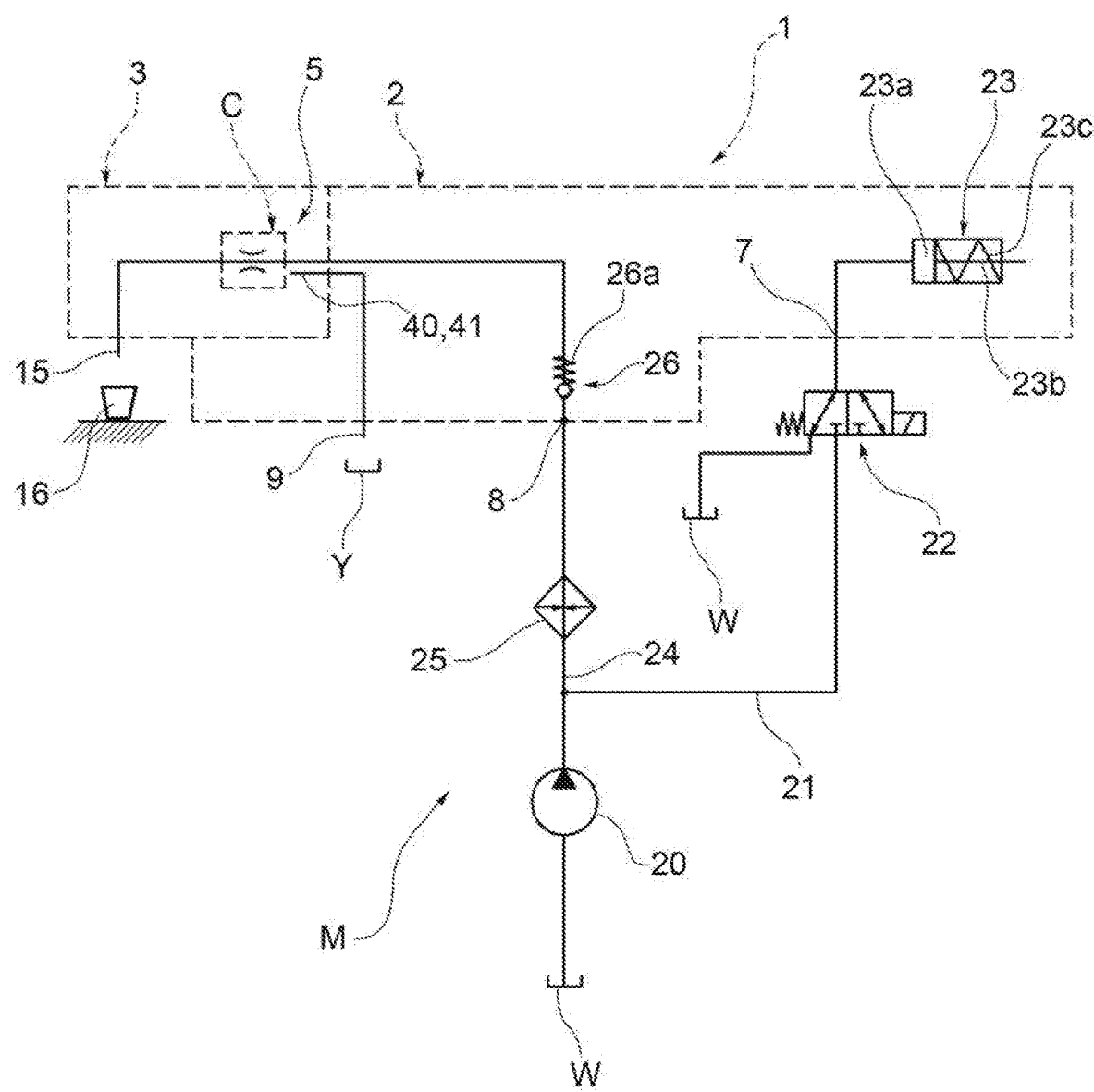
FIG. 4 is a hydraulic diagram of a machine for the preparation of beverages comprising a brewing unit according to the present invention.
Figure 5:
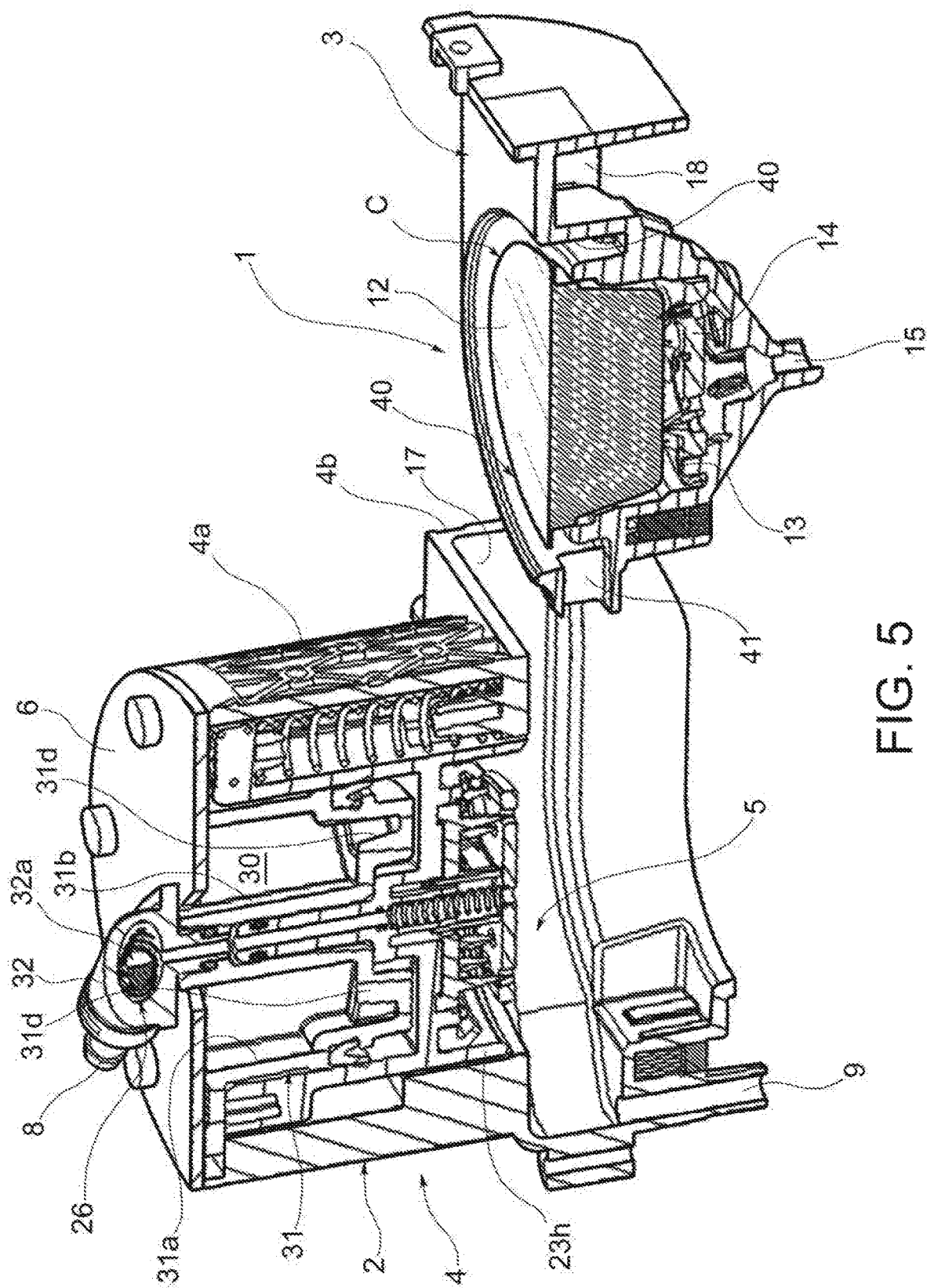
FIG. 5 is a partially sectioned perspective view similar to the one shown in FIG. 3.
Figure 10:
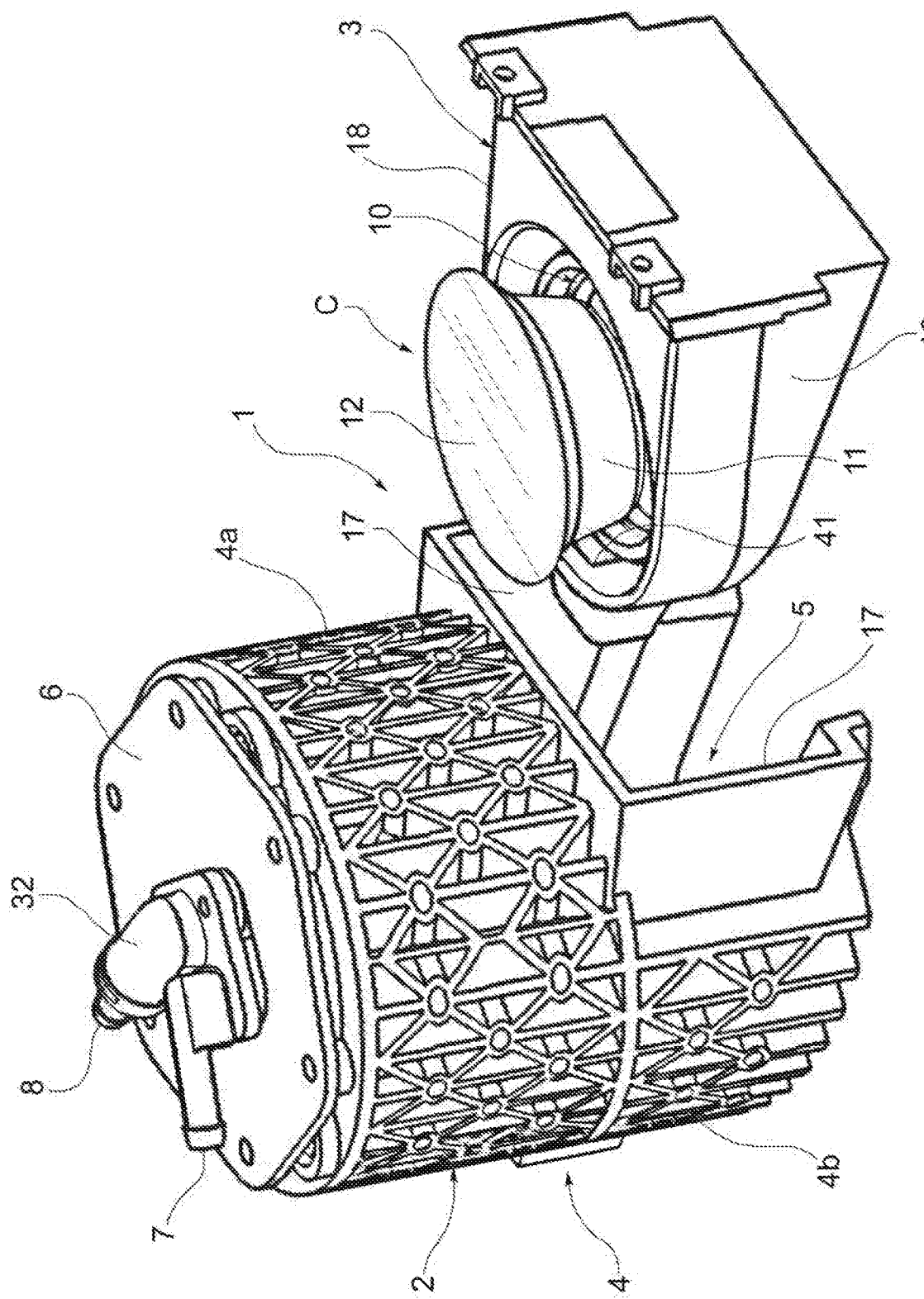
FIG. 10 is a partially exploded perspective view of another brewing unit according to the present invention.

The support structure 2 includes a molded body 4, with a substantially tubular upper part 4a and a hollow lower part 4b in which a brewing zone, indicated 5 in FIGS. 3, 5 and 10, is defined. The upper part 4a of the support structure 2 is closed superiorly by a lid 6, to which an inlet fitting 7 for a flow of cold water and an inlet fitting 8 for a flow of hot water are connected, the functions of these fittings being better described hereinafter. On the other hand, in the lower part 4b of the support structure 2 a discharge fitting 9 for discharge to a collecting container, indicated Y in the diagram of FIG. 4, is made.

In the movable drawer 3 a receptacle 10 (see for example FIG. 3) is defined, which is adapted to accommodate a capsule C of a type known per se, for example of the type produced and marketed by the Applicant under the brand "A MODO MIO". In the illustrated embodiment, the capsule C is of the type having an essentially cup-shaped body 11, preferably of a substantially frustoconical shape, closed superiorly by a top wall or lid 12.

Figure 6:
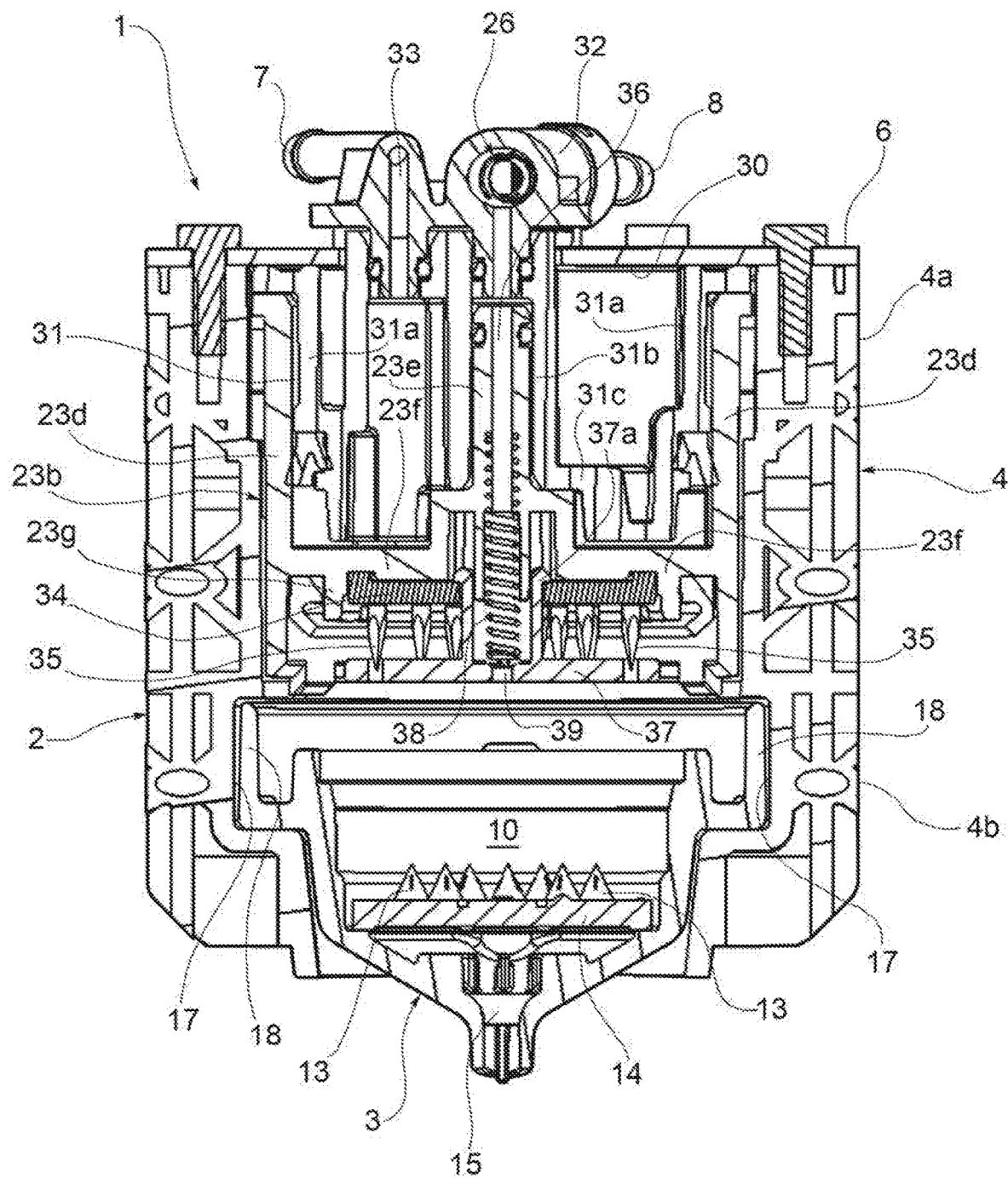
FIG. 6 is an axial sectional view through line VI-VI of FIG. 1.

As can be seen for example in FIG. 6, at the bottom of the receptacle 10 in the drawer 3 a plurality of piercing points 13 are provided, which face upward and in which respective passages are made for the outflow of the beverage made with the use of the capsule C positioned in such receptacle. The points 13 are carried by a plate 14 which extends above an outflow conduit 15 made in the lower part of the drawer 3. The outflow conduit 15 is intended to dispense the final beverage into a collection container 16 (FIG. 4), such as a cup, a glass, or other.

With reference in particular to FIGS. 3, 5 and 6, in the illustrated embodiment the support structure 2 defines in the lower part 4b of the body 4 two facing and parallel recesses 17, adapted to act as sliding guides for two corresponding side walls 18 projecting transversely from the drawer 3.

When the drawer 3 is fully inserted by means of guided linear sliding into the lower part 4b of the body 4, as shown in FIGS. 1, 2 and 7 through 9, the capsule C positioned in the receptacle 10 is arranged in the brewing zone 5 defined in the support structure 2, with its top wall 12 facing upwards. Once a beverage has been prepared and dispensed with the use of the capsule C thus introduced into the brewing zone 5, the drawer 3 can be extracted to allow ejection of the exhausted capsule C and loading of a new capsule, if any.

Before proceeding further with the description of the brewing unit according to the present invention, it is appropriate to describe the structure of a machine for the preparation of beverages comprising such a brewing unit, with reference to the diagram shown in FIG. 4.

Such a machine, generally indicated M in FIG. 4, comprises a casing (not shown) in which an electric pump 20, e.g. a vibration pump, for pumping a flow of water drawn from a container or reservoir W is mounted. On the output or discharge side of the pump 20, the hydraulic circuit bifurcates and has a conduit 21 which, passing through a three-way two-position normally-closed solenoid valve 22, reaches the cold water inlet fitting 7 of the brewing unit 1 according to the present invention. This fitting communicates with the working chamber 23a of a single-acting hydraulic cylinder 23, provided (as better described hereinafter) inside the support structure 2 of the brewing unit 1. Downstream of the pump 20, another conduit 24 leads to an electric heating device 25 (boiler) of a type known per se, the output of which is connected to the hot water inlet fitting 8 of the brewing unit 1 according to the present invention.

As will be described in more detail below, in the brewing unit 1 the hot water inlet fitting 8 is connectable to the brewing zone 5 through a normally-closed check valve 26, which is adapted to open when the hot water supplied to its inlet has a pressure sufficient to overcome the action of a spring 26a to allow the supply of a flow of hot water to the brewing zone 5 and through the capsule C therein positioned by means of the drawer 3, in order to prepare a beverage.

The machine M described above with reference to FIG. 4 operates substantially in the following manner. When the pump 20 is activated and, almost simultaneously, the solenoid valve 22 is energized, a flow of cold water, taken from the tank W, is pumped into the conduit 21 and, passing through the solenoid valve 22 and the inlet fitting 7 of the brewing unit 1, reaches the chamber 23a of the hydraulic cylinder 23. A flow of cold water is also pumped into the conduit 24 and then heated through the heater device 25 until reaching the check valve 26, which initially remains closed. A piston 23b of the cylinder 23 (as will be better clarified in the following) moves as a result of the pressurized water supplied to the chamber 23a and causes, by means of the points 13, the perforation of the top wall 12 of the capsule C positioned in the brewing zone 5. When the piston 23b of the cylinder 23 reaches the end of its stroke, the water pressure at the inlet of the check valve 26 begins to increase. As soon as this pressure is able to overcome the counter action exerted by the spring 26a, the valve 26 opens and a flow of pressurized hot water reaches the brewing zone 5 and passes through the previously pierced capsule C, allowing the desired beverage to be made, by means of infusion, the beverage being fed through the dispensing conduit 15 of the drawer 3 to the collection container 16. As soon as the user stops the pump 20, the valve 22 is de-energized and returns to its normally closed condition, allowing the piston 23b of the cylinder 23 to return to its initial position under the action of a return spring 23c (FIG. 4) and discharging the cold water from the chamber 23a toward the tank W through the same solenoid valve 22. The user may then remove the drawer 3 to eject the exhausted capsule C and then the machine M is ready to start a new working cycle.

With reference now again to FIGS. 5 through 9, inside the upper part 4a of the body 4 a wide, substantially cylindrical, central cavity 30 is defined, which accommodates a stationary structure 31 including an external tubular part 31a and an internal tubular part 31b, which are inferiorly connected to one another by an annular wall 31c having in cross-section a stepped profile (see in particular FIG. 7). The upper end of the inner tubular part 31b of the structure 31 is liquid-tightly coupled to the outlet conduit of a hollow body 32 mounted on the lid 6 and connected to the hot water inlet fitting 8. In the hollow body 32 a chamber 32a is defined which accommodates the check valve 26, already described with reference to the diagram of FIG. 4.

As seen in FIG. 6, the inner region of the structure 31, and in particular the region between the walls 31a, 31b and 31c of the structure 31, is in communication with the cold water inlet fitting 7, through a conduit indicated 33 in this Figure.

Inside the upper part 4a of the body 4, around the outer tubular wall 31a and inside the tubular wall 31b of the stationary structure 31, the piston 23b of the single-acting cylinder 23 already described with reference to FIG. 4 is sealingly and slidably mounted. The piston 23b has in particular an outer tubular shell 23d, which surrounds the wall 31a of the structure 31, a tubular portion 23e sealingly slidable within the tubular portion 31b of the structure 31 and an annular lower wall 23f, which connects the tubular portions 23d and 23e (see in particular FIG. 6).

Figure 7:
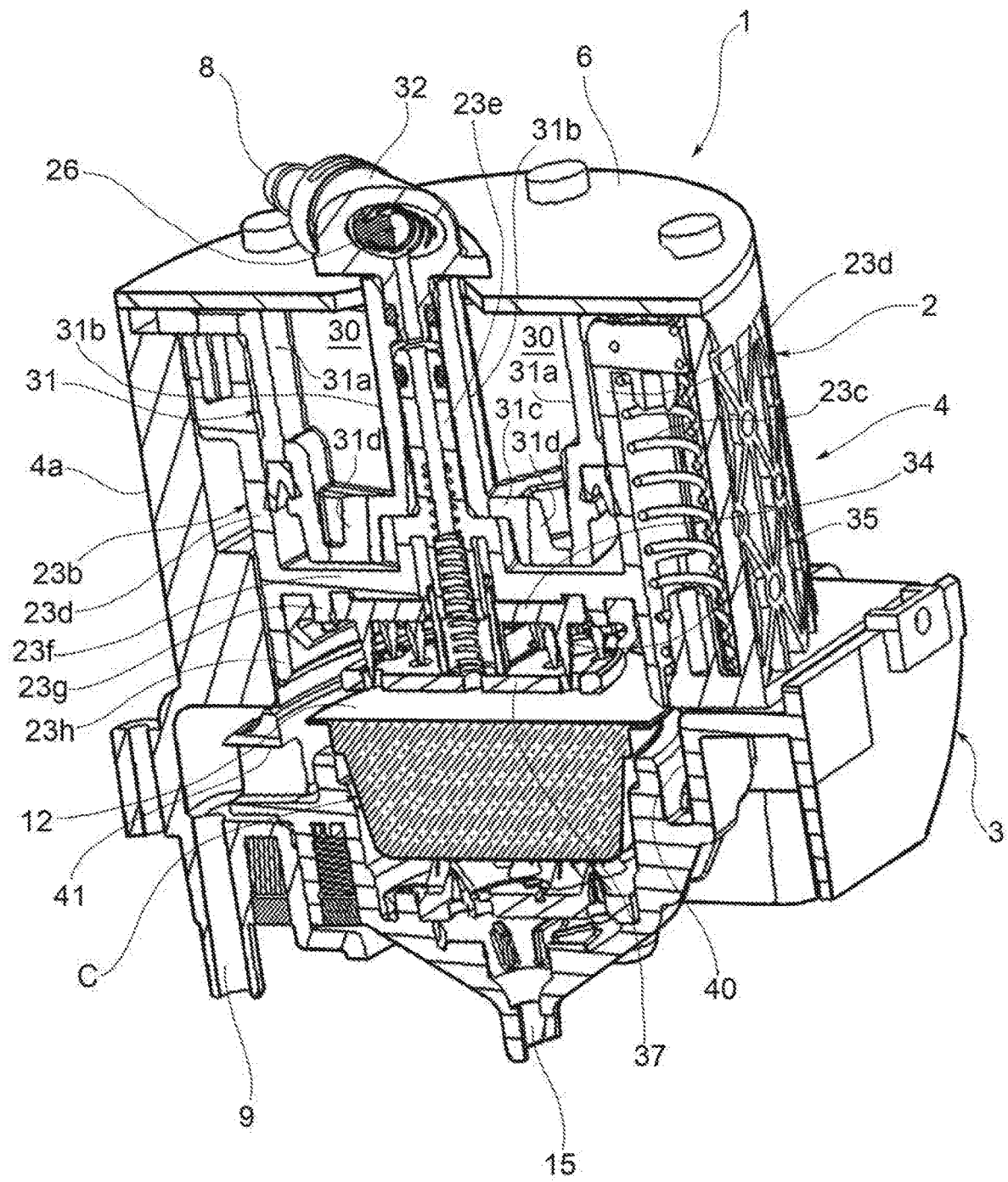
FIG. 7 is another axially sectioned perspective view, through line VII-VII of FIG. 1.
Figure 8:
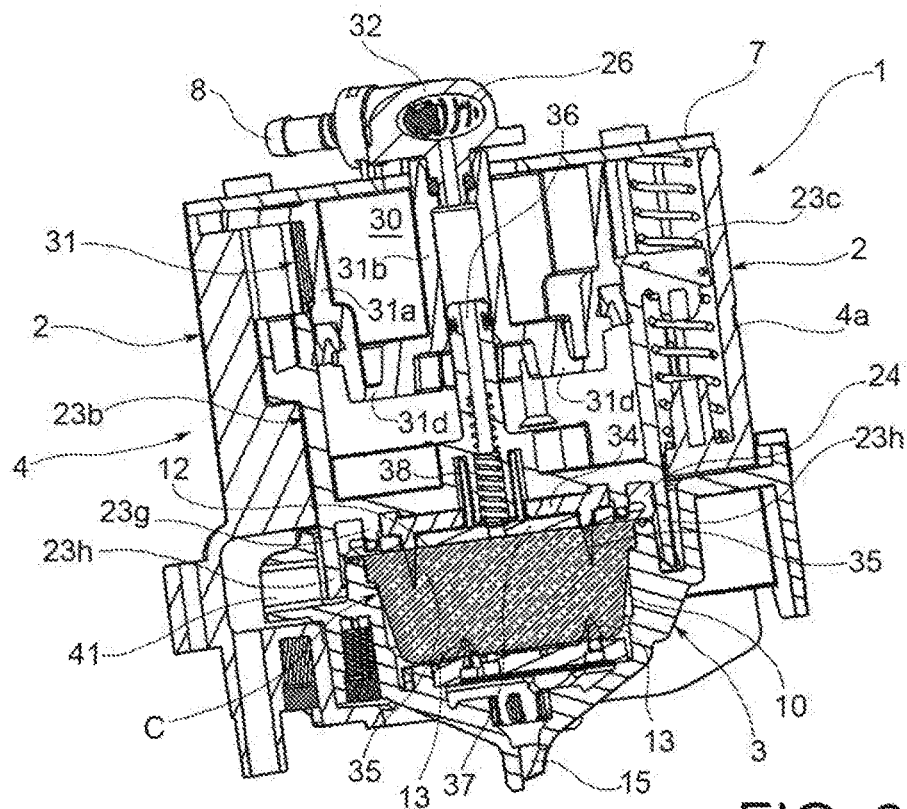
FIGS. 8 and 9 are axial sectional views of the brewing unit of the preceding Figures, shown in two different operating conditions.
Figure 9:
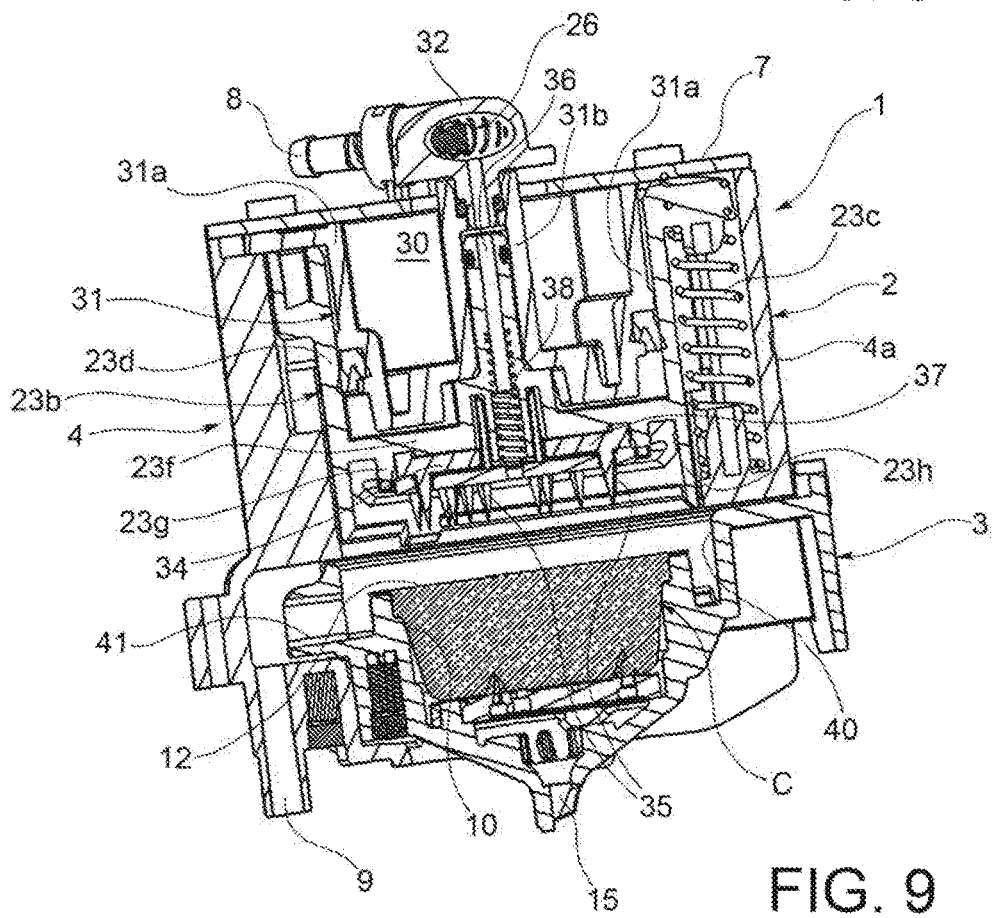

As can be seen in FIGS. 7 to 9, between the outer wall of the upper portion 4a of the body 4 and the outer tubular portion 23d of the piston 23b a plurality of receptacles are defined, only one of which is visible in these Figures, wherein the compression spring 23c, as already described above with reference to FIG. 4, is housed. These springs tend to push the piston 23b upwards and to maintain it in the rest position shown in FIGS. 6, 7 and 9. The springs 23c react superiorly against the corresponding transverse appendages of the piston 23b.

In the illustrated embodiment (FIGS. 8 and 9), an annular projection 23g extends downwards from the lower face of the annular wall 23f of the piston 23b. Inside the annular projection an annular plate 34 is held, which is provided inferiorly with a plurality of solid piercing points 35 facing downwards. The annular plate 34 has a central opening, which is coaxial with the conduit 36 defined within the tubular portion 23e of the piston 23b (FIG. 6).

A protective disc 37 is associated to the annular plate 34 and is provided with a plurality of passages through which the piercing points 35 may extend. The disc 37 has superiorly a tubular formation 37a (FIG. 6) which is axially slidably mounted in the central opening of the plate 34. A helical spring 38 is interposed between the central tubular portion 23e of the piston 23b and the disc 37 and tends to keep the latter in the condition illustrated in FIG. 6, where it extends below the piercing points 35, both to facilitate detachment of the top wall 12 of the capsule C from the points 35 and to prevent, when the drawer 3 is extracted, the user from getting hurt by these points 35, e.g. during cleaning operations. The protective disc 37 has a central opening indicated 39 in FIG. 6.

As will be even more apparent from the remaining part of in the present description, the assembly comprising the piston 23b and the plate 34 with the points 35 forms a piercing and hot water supply device for the capsule C positioned in the brewing zone 5 by means of the drawer 3 inserted into the support structure 2 of the brewing unit.

In the drawer 3, around the receptacle 10 for the capsules C, an annular channel is defined and is indicated 40 in the drawings.

The piston 23b in its lower part forms an annular wall 23h projecting downwards. The arrangement is such that when the piston 23b is in the raised rest position (FIGS. 7 and 9), the annular wall 23h extends outwardly, i.e. above and outside, of the annular channel 40 of the drawer 3 inserted into the support structure 2 of the brewing unit. By contrast, when the piston 23b is lowered to its working position in which the points 35 of the associated annular plate 34 pierce the capsule C carried by the drawer 3, the annular lower wall 23h of the piston 23b is inserted into the annular channel 40 of this drawer 3, preventing communication between the portion of the brewing zone overlying the capsule C and a lateral passage 41, which would otherwise be able to put the annular channel 40 in fluid communication with the discharge fitting 9 of the brewing unit.

As can be seen for example in FIG. 7, in the annular wall 31c of the structure 31 a plurality of openings 31d are made, through which pressurized water contained in the annular chamber 30 may flow and thus hit the underlying annular wall 23f of the piston 23b.

The arrangement of the brewing unit 1 in a machine M for the preparation of beverages is such that the introduction and extraction of the drawer 3 in the support structure 2 takes place in an inclined plane with respect to the horizontal plane, as may be appreciated in particular from FIGS. 5, 8 and 9. The drawer 3 is inserted into the support structure 2 with a downward translational movement. The arrangement is such that when the drawer 3 is inserted into the support structure 2 with a capsule C positioned in its receptacle 10, the top wall 12 of the capsule C lies substantially in a plane inclined to the horizontal plane.

The brewing unit 1 according to the present invention described above with reference to FIGS. 1 to 9 operates substantially as follows.

In order to prepare a beverage, the user put a capsule C into the receptacle 10 of the drawer 3 and then inserts the latter into the support structure 2 and slides it up to place it in the operating condition shown in FIG. 7. The capsule C is thus arranged below the piston 23b and the associated plate 34, which bears the points 35. The user then activates the machine M, whereby the pump 20 is activated and the solenoid valve 22 is energized. As a result, a flow of cold water reaches the inlet fitting 7 of the brewing unit 1 and then the chamber 30 above the piston 23b, passing through the passages 31d of the structure 31. The piston 23b then descends in the direction of the capsule C, until the protective disc 37 comes to rest on the top wall 12 of the capsule. The further descent of the piston 23b causes the plate 34 to approach the disc 37, against the reaction force of the spring 38 which is compressed, in such a way that the points 35 pierce the top wall 12 of the capsule C and penetrate into the capsule, as illustrated in FIG. 8. At the same time, the piercing points 13 of the drawer 3 penetrate through the bottom wall of the capsule C. The lower lip seal 24, which is carried by the piston 23b, closes a peripheral portion of the top wall 12 of the capsule C in a liquid-tight manner. When the piston 23b can no longer descend further, the hydraulic pressure at the inlet of the check valve 26 increases until it overcomes the resistance of the spring 26a thereof. A flow of pressurized hot water then reaches the passage 36 defined within the piston 23b and reaches the region between the lower part of the piston 23b and the top wall 12 of the capsule C. The top wall 12 is slightly flexed downwards, forming a small bowl and the pressurized hot water enters the capsule C through the annular passages defined between the points 35 and the edges of the corresponding holes made by the points in the top wall 12 of the capsule. The brewing of the beverage is thus completed and the beverage flows out through the passages defined in the lower piercing points 13 of the drawer 3 and then through the discharge conduit 15 of that drawer. Once the dispensing of the beverage is completed, the user deactivates the machine M: the pump 20 stops and the solenoid valve 22 returns to its normally closed condition, shown in FIG. 4. Under the action of the springs 23c, the piston 23b is returned to the initial raised position (FIG. 9). In such movement, the piston 23b carries with it the plate 34, the points 35 of which disengage from the exhausted capsule C. When the piston 23b moves away from the top wall 12 of the capsule C, its lower annular formation 23h leaves the channel 40 of the drawer 3 and the residual water which is still on this wall can, as a result of the inclination of the capsule, fall into the conduit 40 that surrounds the receptacle 10 and flow through the passage 41 of the drawer 3 and the discharge conduit 9 of the support structure 2. This is advantageously done before the user pulls the drawer 3 from the support structure 2, so that when this happens there is no risk of causing unwanted splashes. The exhausted capsule C may then be removed from the drawer 3 and a new capsule C may be introduced into the latter when one desires to proceed to the preparation of a new beverage.

Figure 11:
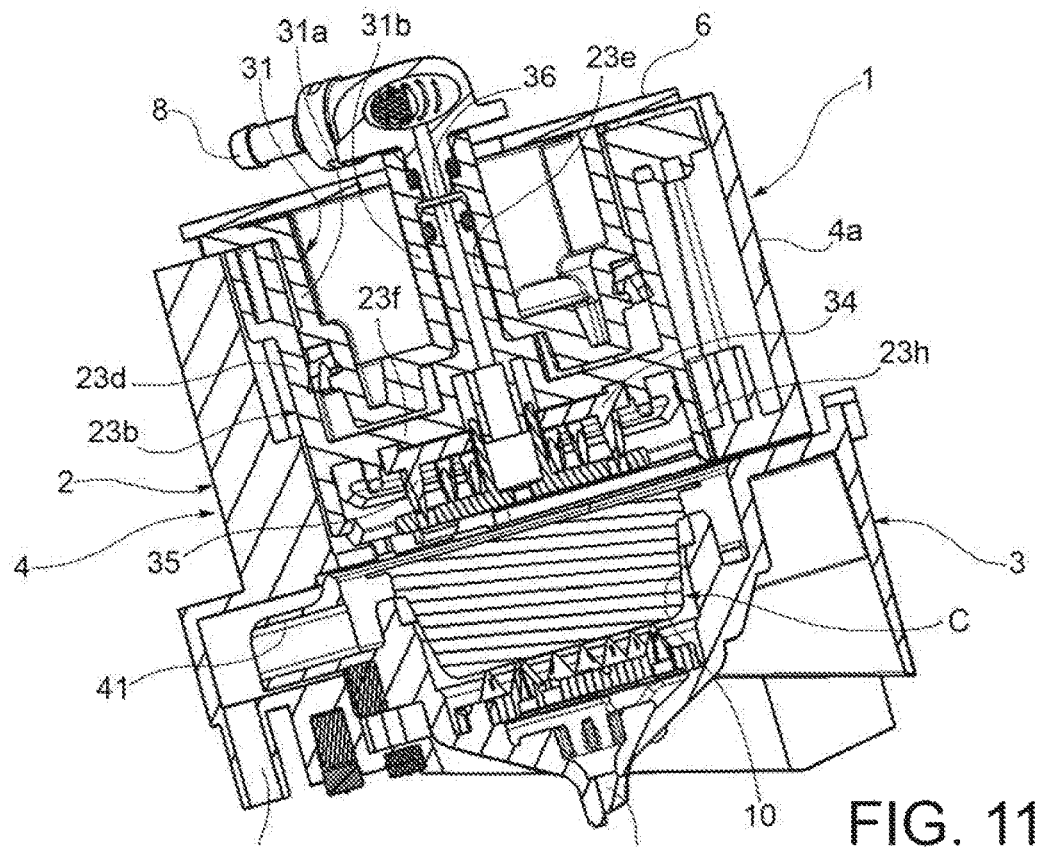
FIGS. 11 and 12 are axial sectional views of the brewing unit of FIG. 10 and show two different operating conditions.
Figure 12:
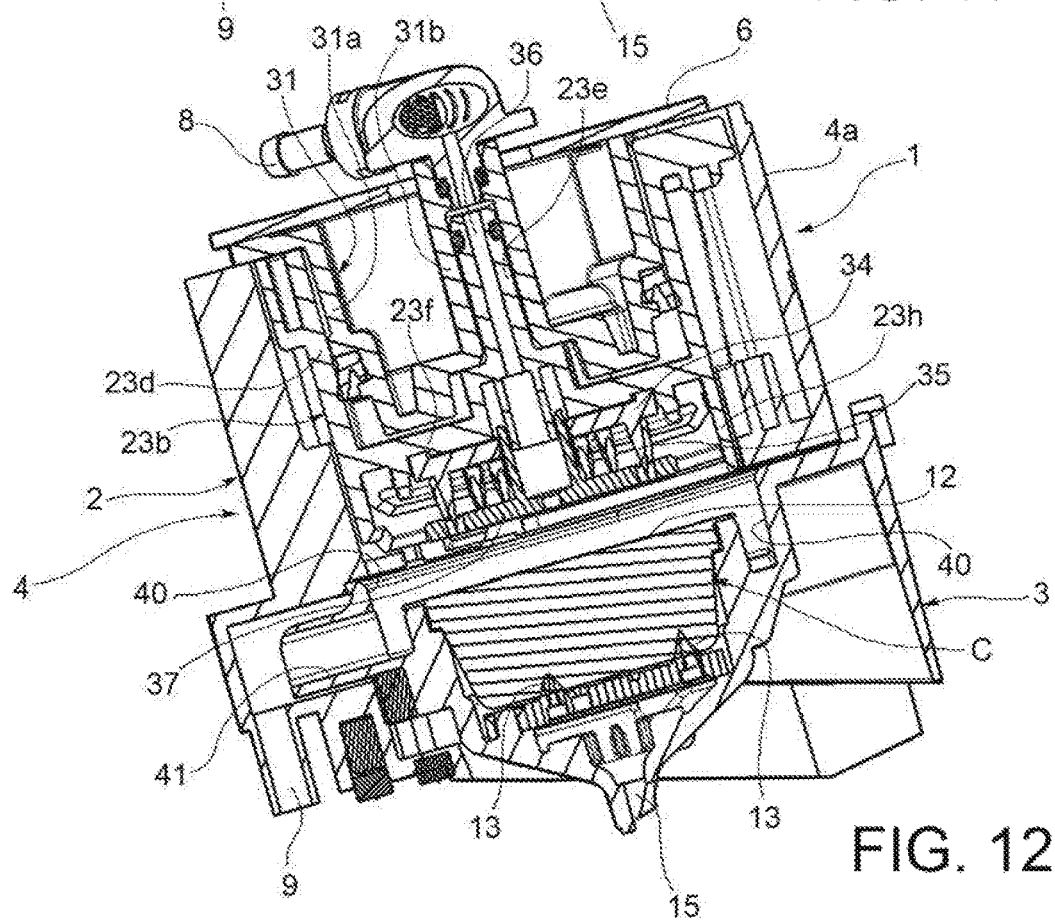

FIGS. 10 to 12 show a first variant of embodiment. In these Figures, the same reference numbers as those previously used have been given again to the parts and elements already described. In the embodiment according to FIGS. 10 to 12, the guide formations 17 made in the lower part 4b of the support structure 2 (FIG. 10) are shaped essentially in the form of a wedge and the drawer 3 has corresponding side wall portions 18 tapered into a wedge. The drawer 3 is introduced into the bearing part 2 by means of a rectilinear translational motion, for example in a horizontal plane. The capsule C carried by the drawer 3, however, is operatively inclined to the horizontal plane, as can be seen in FIGS. 11 and 12, similarly to what has been described above in connection with the embodiment of FIGS. 1 to 9. For the rest, the structure and the mode of operation of the variant according to FIGS. 10 to 12 correspond to those of the previously described embodiment.

Figure 13:
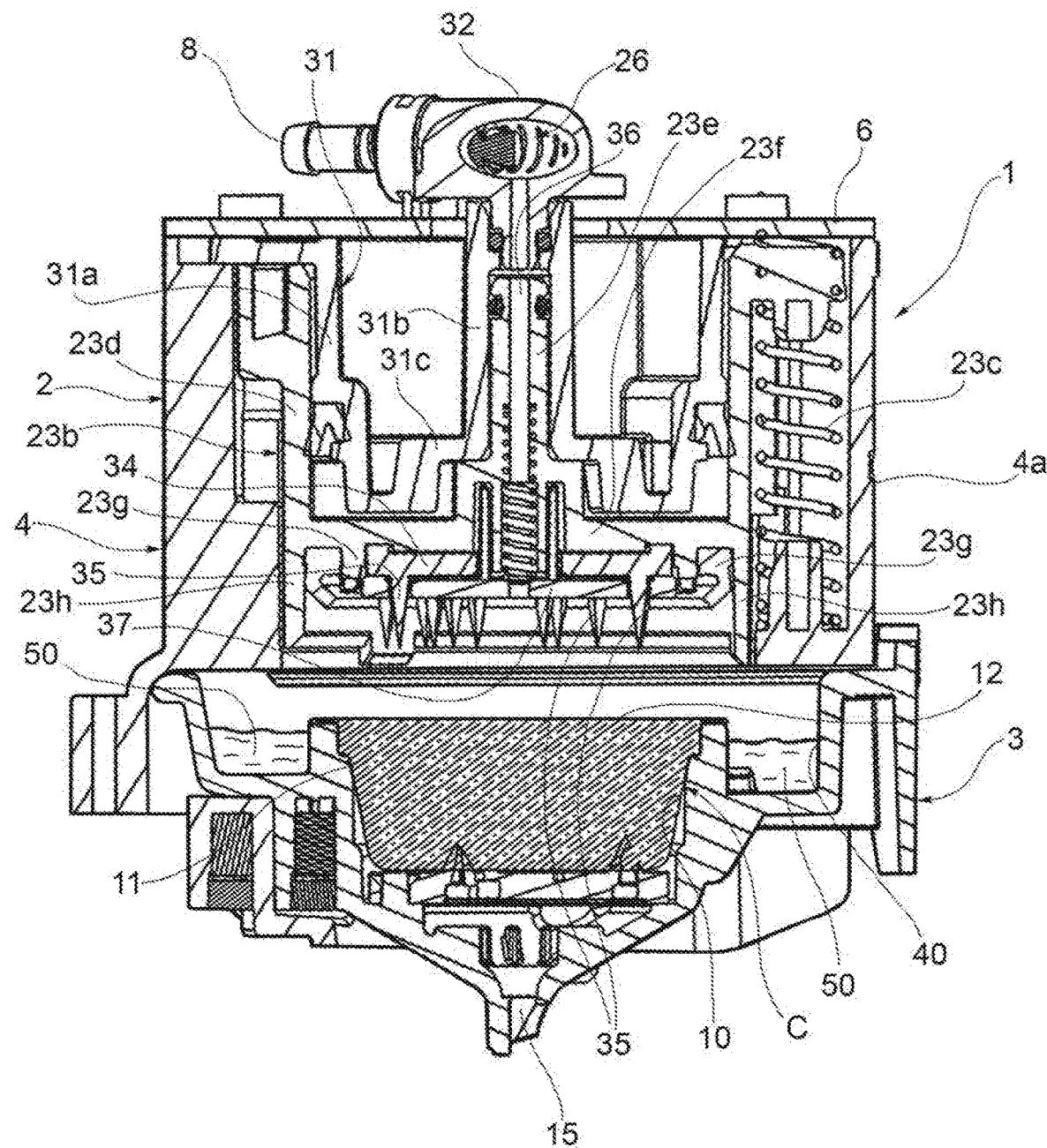
FIG. 13 is an axial sectional view of yet another brewing unit according to the invention.

FIG. 13 shows a further variant of embodiment. Also in this Figure, the same reference numbers as those already used before have been given to parts and elements already described. In the variant of FIG. 13 the annular conduit or channel 40 made in the drawer 3 does not have the outlet passage 41 of the previously described embodiments, and its outer side wall is therefore closed. The capacity of this channel 40 is, however, adequately increased in such a way that after preparation of the beverage the residual water (indicated at 50 in FIG. 13) which falls into this channel from the top surface of the capsule C is contained in the lower part of said conduit or channel, at a distance from the top edge of the same so as to exclude the risk that during extraction of the drawer 3 the user may inadvertently cause such residual water to splash. Once the drawer 3 has been extracted, the user may then, with a single maneuver, discharge both the capsule C and the residual water 50 contained in the channel 40 of the drawer.

Naturally, the principle of the invention remaining unchanged, the embodiments and constructional details may be greatly varied with respect to those described and illustrated here purely by way of a non-limiting example, without thereby departing from the scope of the invention as defined in the accompanying claims.

The invention claimed is:

1. A brewing unit (1) for the preparation of a beverage, comprising
a support structure (2) which is stationary in operation and in which a brewing zone (5) is defined where a hydraulically operated piercing and liquid-supplying device (23, 34, 35) is mounted movable between a retracted rest position and an extracted working position, and
an associated movable drawer (3) which forms a receptacle (10) adapted to receive a capsule (C) containing a substance for the preparation of a beverage and is insertable into and extractable from said support structure (2) to place a capsule (C) in the brewing zone (5) with a top wall (12) of the capsule (C) facing said piercing and liquid-supplying device (23, 34, 35) and to allow an exhausted capsule (C) to be ejected after the beverage has been dispensed and a new capsule (C) has been loaded;
wherein the piercing and liquid-supplying device (23, 34, 35) comprises a plurality of points (35) for piercing said top wall (12) of a capsule (C) placed in the brewing zone (5) and a conduit (36) for supplying a flow of pressurized liquid to a brewing chamber adjacent and above the top wall (12) of the capsule (C) and thereafter inside the capsule (C) through holes pierced by the points (35) in the top wall (12) of the capsule (C),
wherein the brewing unit (1) is configured in such a manner that when the drawer (3) is inserted into the support structure (2) with a capsule (C) positioned in the receptacle (10), the top wall (12) of the capsule (C) lies essentially in a plane inclined to the horizontal plane,
wherein in the drawer (3) there is defined a discharge channel (40) adapted to be put into fluid communication with the region above the top wall (12) of the capsule (C) when, after the beverage has been prepared and dispensed, the piercing and liquid-supplying device (23, 34, 35) moves from the extracted work position to the retracted rest position, to allow pouring of the remaining liquid from said region to the discharge channel (40), and
wherein the discharge channel (40) of the drawer (3) is continuously annularly arranged around an outer circumference of the capsule (C) and has an outlet passage (41) which, when the drawer (3) is inserted in the work position into the support structure (2), is adapted to be put into fluid communication with a discharge conduit (9) arranged in said support structure (2) by the return of the piercing and liquid-supplying device (23, 34, 35) to the retracted rest position, whereas an annular lower wall (23h) of said piercing and liquid-supplying device (23, 34, 35) is inserted into said discharge channel (40) preventing fluid communication through said outlet passage (41) from said discharge channel (40) to said discharge conduit (9), when said piercing and liquid-supplying device (23, 34, 35) is in its working position.

2. The brewing unit according to claim 1, wherein the discharge channel (40) of the drawer (3) has a capacity which is larger than the volume of the remaining liquid that may be poured into the discharge channel (40) when the piercing and liquid-supplying device (23, 34, 35) returns to the retracted rest position.

3. A machine (M) for the preparation of beverages, comprising the brewing unit (1) according to claim 1.

4. A system for the preparation of beverages, comprising the machine (M) according to claim 3.

5. A machine (M) for the preparation of beverages, comprising the brewing unit (1) according to claim 2.

* * * * *